United States Patent
Williams et al.

(10) Patent No.: US 8,306,582 B2
(45) Date of Patent: Nov. 6, 2012

(54) SWIVEL EXTENSION CLIP FOR A COMMUNICATION DEVICE

(75) Inventors: William R. Williams, Coral Springs, FL (US); Scot A. Hendry, Elgin, IL (US); Kamilla L. Krzeminska, Bartlett, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 830 days.

(21) Appl. No.: 12/271,876

(22) Filed: Nov. 15, 2008

(65) Prior Publication Data

US 2010/0124957 A1     May 20, 2010

(51) Int. Cl.
*H04M 1/00* (2006.01)
(52) U.S. Cl. .................. 455/575.1; 455/550.1
(58) Field of Classification Search .......... None
See application file for complete search history.

(56) References Cited

U.S. PATENT DOCUMENTS

| | | | |
|---|---|---|---|
| 4,135,416 A * | 1/1979 | Roux | 81/478 |
| 5,979,019 A | 11/1999 | Johnson | |
| 6,953,259 B2 | 10/2005 | Parsons et al. | |
| 7,162,281 B2 * | 1/2007 | Kim | 455/575.1 |
| 7,580,725 B2 * | 8/2009 | Delker et al. | 455/550.1 |

FOREIGN PATENT DOCUMENTS

WO    WO8602152 A1    4/1986

* cited by examiner

*Primary Examiner* — Cassandra Cox
(74) *Attorney, Agent, or Firm* — Barbara R. Doutre (57) ABSTRACT

Swivel clip (200) provides independently adjustable hinge point location (500), adjustable clip length (210) and rotational position for user-configurable attachment. Swivel clip (200) is formed of a two piece paddle (216/218) and a two piece swivel plate (246, 248) coupled via a hinge pin (502). The two piece paddle (216/218) provides adjustable clip length. The two piece swivel plate provides linear adjustment and rotational adjustment of the hinge point location (500) through the use of a hinge plate (246) and swivel plate (248).

18 Claims, 11 Drawing Sheets

SWIVEL EXTENSION CLIP FOR A COMMUNICATION DEVICE

FIELD OF THE INVENTION

The invention generally relates to portable communication devices and more particularly to swivel clips used for mounting, wearing and carrying portable communication devices.

BACKGROUND OF THE INVENTION

Portable communication devices, such as portable radios and remote speaker microphones, are often worn by individuals at various positions and angles via the use of a clip. Currently, available clip configurations do not address customers having a variety of wearing arrangement needs. For example, a portable communication device having a belt clip cannot readily be worn on a shoulder epaulette and vice versa.

Existing clip configurations are not capable of fitting, grasping or staying in place while attached to different pieces of clothing. In particular, today's swivel clip configurations are not suitable for products with aspect ratios (height/width) of much higher than one-to-one, thus products incorporating existing swivel clips tend to slide, tilt forward or turn sideways.

Figure 1A:
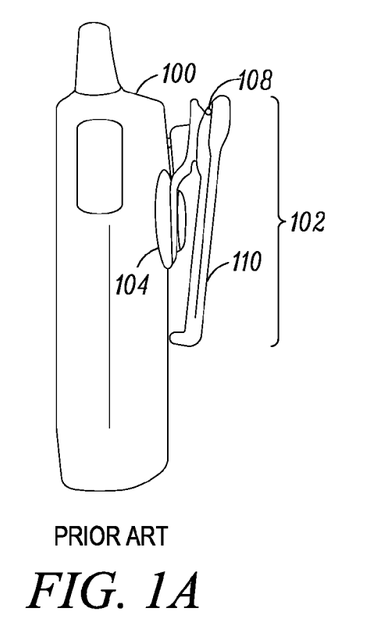
FIG. 1A, 1B, 1C show side, back and top views of a communication device with a prior art swivel clip configuration in a default position and rotated 90 degrees.
Figure 1B:
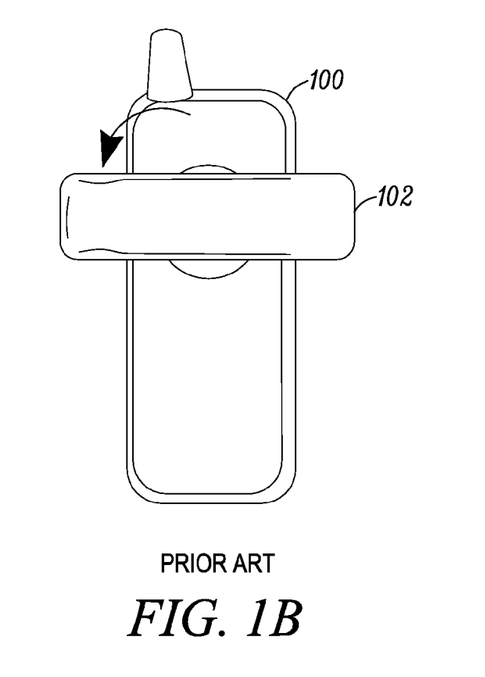
Figure 1C:
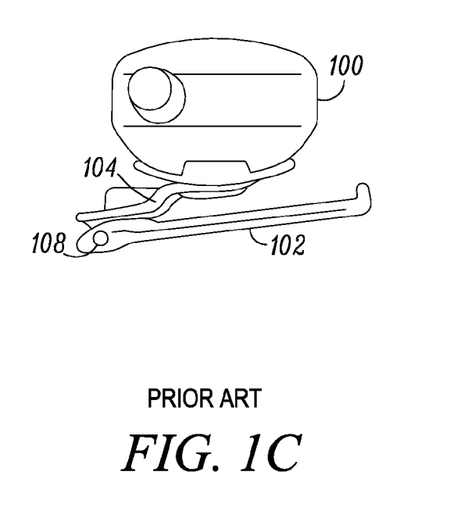

A communication device 100 having a prior art swivel clip configuration 102 is shown in various positions in FIGS. 1A, 1B, 1C. In FIG. 1A, swivel clip configuration 102 is shown in a default position and includes pivot portion 104, hinge 108 and paddle 110. While good clip performance can be obtained with the default position, problems arise when clip 102 is rotated beyond 30 degrees via pivot 104. FIG. 1B shows a back view of communication device 100 with clip 102 rotated 90 degrees. As shown in FIGS. 1B and 1C, the resulting swivel position of a 90 degree rotation prevents the clip 102 from clipping to anything except air. Products incorporating this type of clip tend to move when the paddle is rotated off of its default position due to the paddle failing to grasp the garment (e.g. epaulet or belt) or article (e.g. strap on a briefcase, rear view mirror etc.).

Accordingly, it would be highly desirable to have an improved clip for use with a portable communication device that can reliably grip a variety of different sized and shaped items throughout a 360 degree rotation.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in apparatus components related to a swivel clip configuration having adjustable features that allow positioning of the clip of a portable communication device, such as portable radio or remote speaker microphone, in a user-defined configuration. Most problems arising from existing clip configurations arise from the clip either being too long or too short, improperly grasping the article of clothing because the end of the clip is clamping "air" or poor clip/hinge positioning relative to the communication device's center of mass. The swivel clip provided by the present invention addresses these problems by providing an adjustable swivel clip that allows a user to adjust the clip's hinge location and clip length to suit an orientation the user prefers. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 2A:
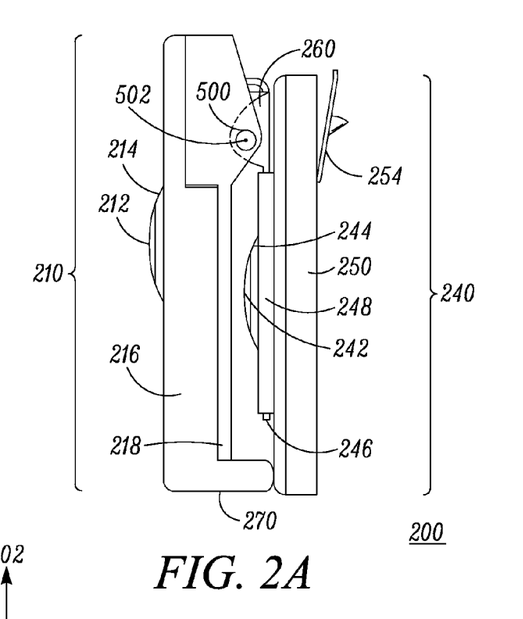
FIG. 2A, 2B, 2C show a swivel clip in various positions in accordance with various embodiments of the invention.
Figure 2B:
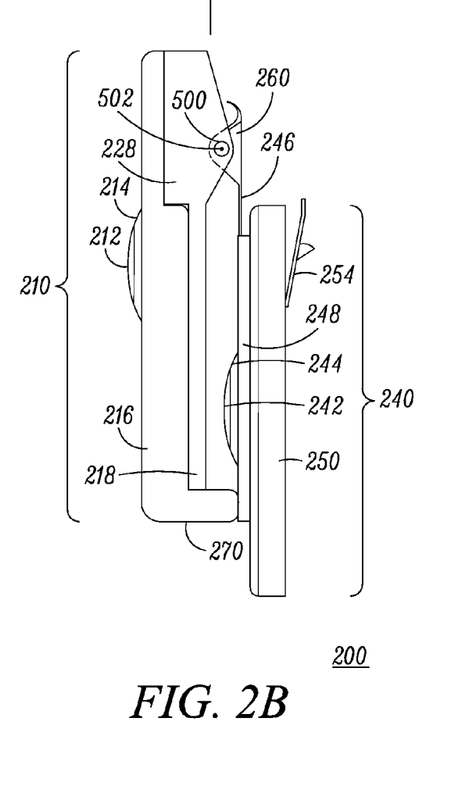
Figure 2C:
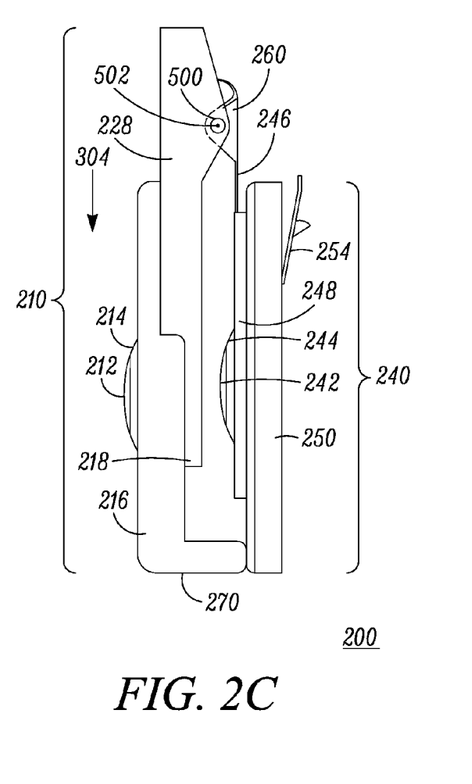

FIGS. 2A, 2B, 2C show a swivel clip 200 formed in accordance with various embodiments of the invention with retracted and extended hinge point locations and retracted and extended paddle positions. FIG. 2A shows a swivel clip 200 in a retracted paddle position and retracted hinge point location 500. FIG. 2B shows the swivel clip with an extended hinge point location 500 and FIG. 2C shows the swivel clip with an extended hinge point location 500 with extended paddle length.

Referring to FIGS. 2A, 2B, 2C, swivel clip 200 comprises an adjustable paddle sub-assembly 210 and adjustable swivel bracket sub-assembly 240. In accordance with the various embodiments, adjustable paddle sub-assembly 210 provides linear clip length adjustment via a two-piece paddle formed of top and bottom paddles 216, 218 respectively. Top paddle 216 includes a lip 270 for securing the clip to a housing, as will be shown in later figures. In accordance with various embodiments, adjustable swivel bracket sub-assembly 240 provides hinge point location 500 adjustment in both a linear and rotational manner. The adjustable clip length and adjustable hinge point location 500 advantageously provide user-configurable attachment of swivel clip 200 to variety different sized and different shaped items.

Still referring to FIGS. 2A, 2B, 2C, upper and bottom paddles 216, 218 of adjustable paddle sub-assembly 210 are coupled via shoulder rivet 212 and spring washer 214. Hinge pin 502 couples paddle sub-assembly 210 to adjustable swivel bracket sub-assembly 240. Adjustable swivel bracket sub-assembly 240 comprises a hinge plate 246 and swivel plate 248 mounted to a back plate 250 via shoulder rivet 242 and spring washer 244. Lock spring clip 254 is used to mount the swivel clip 200 to a housing/device. Hinge plate 246 and swivel plate 248 combine to provide a two-piece swivel plate. The two sub-assemblies 210, 240 provide for a clip whose length can be adjusted linearly in opposing directions, 360 degree rotation about a pivot point and an adjustable hinge point location 500 as will be described herein.

In accordance with the embodiment of FIG. 2B, hinge plate 246 extends (shown here as direction 302), taking the paddle sub-assembly 210 along with it. Further details of the hinge plate extension and retraction are discussed in subsequent views as well as rotation of hinge plate 246 via swivel plate 248. Linear extension and retraction of hinge plate 246 is made independently of any adjustment to paddle sub-assembly 210.

In accordance with the embodiment of FIG. 2C, top paddle 216 extends and linearly in direction 304, while the hinge point location 500 remains in place. The ability to adjust the length independently of rotation allows a user to have lip 270 make contact with housing of a communication device (to be shown later), as opposed to overhanging into free space. The details of the extension and retraction of top paddle 216 are discussed in subsequent views. Extension and retraction of top paddle 216 is made independently of any adjustment to swivel bracket assembly 240.

Figure 3A:
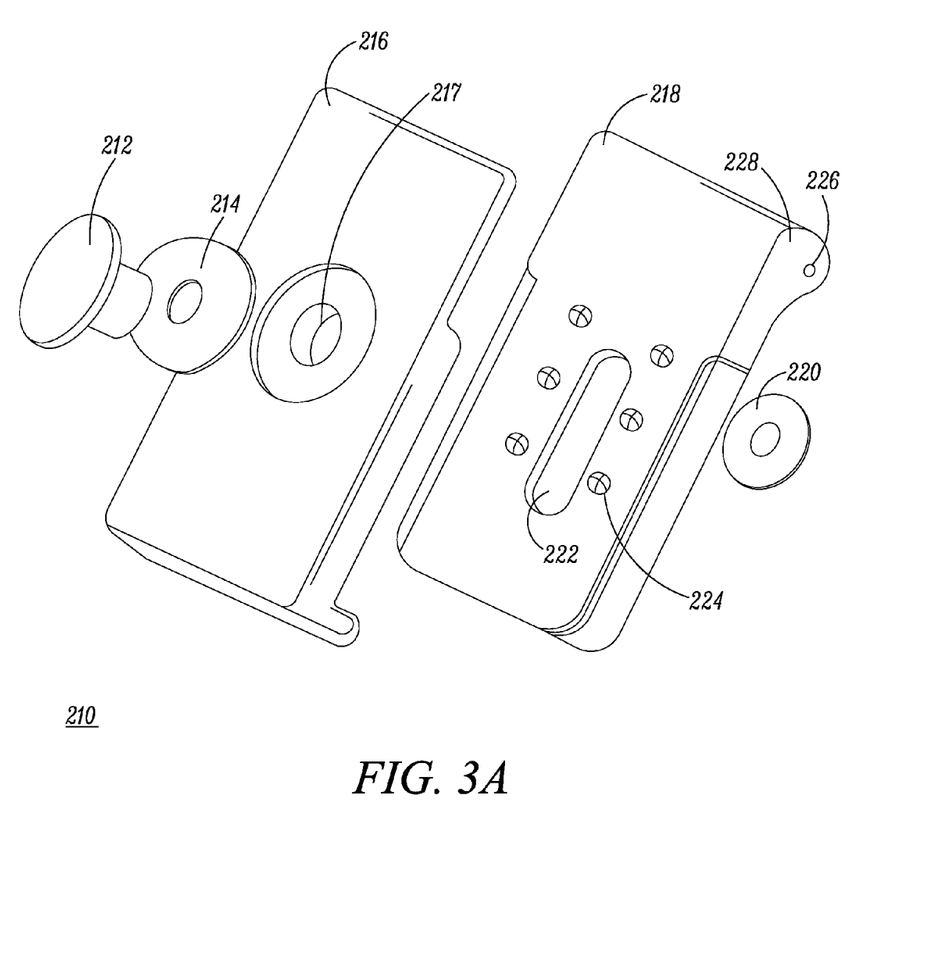
FIGS. 3A, 3B, and 3C show exploded and partial cutaway perspective views of an adjustable paddle sub-assembly in accordance with various embodiments of the invention.
Figure 3B:
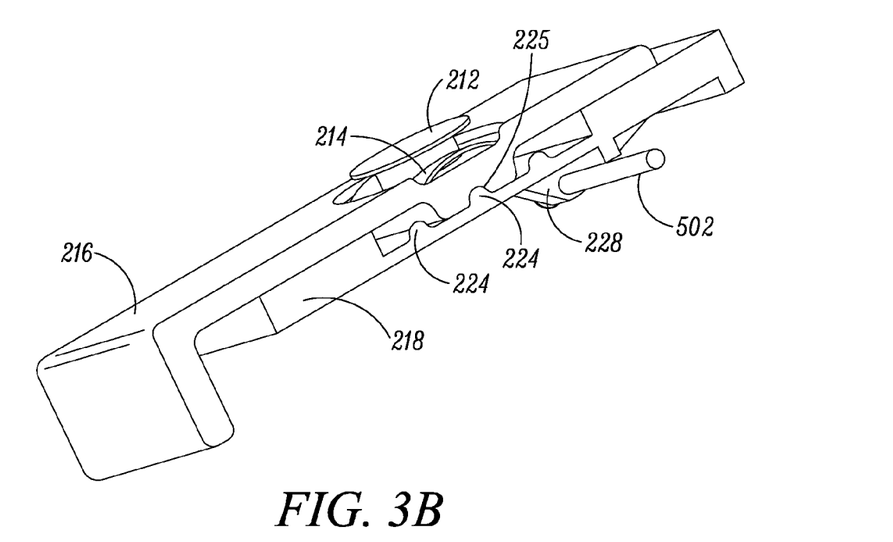
Figure 3C:
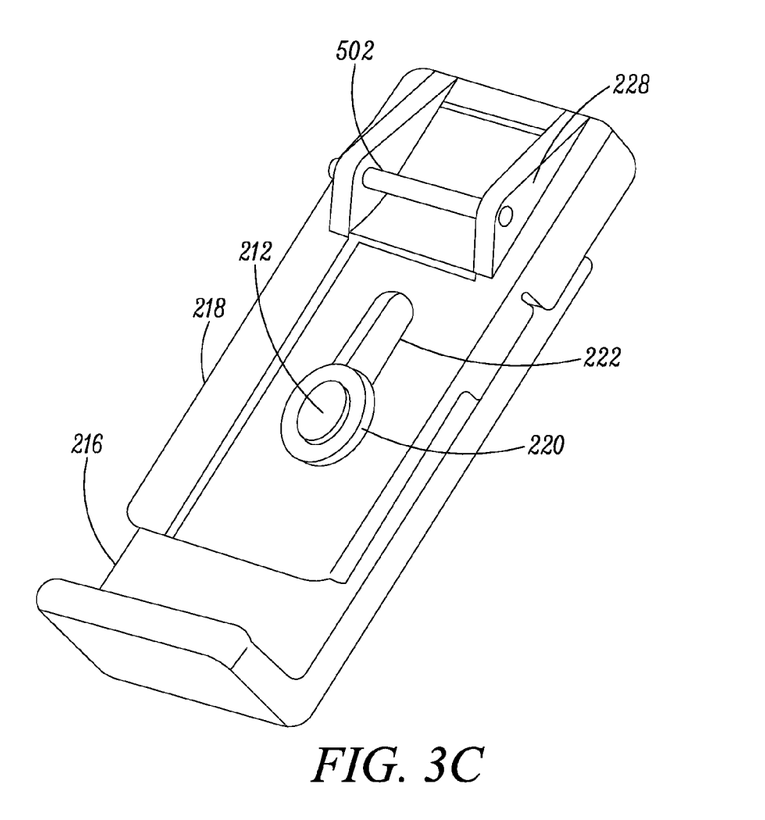

FIGS. 3A, 3B, 3C show the adjustable paddle sub-assembly 210 in more detail in accordance with various embodiments. FIG. 3A shows an exploded view of the two piece paddle while FIGS. 3B, 3C show partial cutaway perspective views of the assembled two piece paddle in accordance with various embodiments.

The exploded view of FIG. 3A of adjustable paddle sub-assembly 210 illustrates shoulder rivet 212, spring washer 214, and top paddle 216 having an opening 217 for receiving the shoulder rivet and spring washer. The adjustable paddle sub-assembly 210 further comprises bottom paddle 218 having an elongated aperture 222 formed therein. A flat washer 220 for coupling to the end of the shoulder rivet 212 is also provided. The bottom paddle 218 further comprises bumps 224, and hinge bracket area 228 having hinge pin-hole 226.

As seen in FIGS. 3B and 3C, to assemble the adjustable paddle sub-assembly 210, shoulder rivet 212 and spring washer 214 are coupled within opening 217 such that shoulder rivet 212 protrudes through elongated aperture 222 where it is secured by flat washer 220. As the top paddle 216 is slid along the bottom paddle 218, openings 225 catch the bumps 224 thereby adjusting the overall length of the paddle sub-assembly 210. The two piece paddle 216/218 thus provides a retractable and extendable clip by providing an adjustable clip length in opposite directions.

Figure 4A:
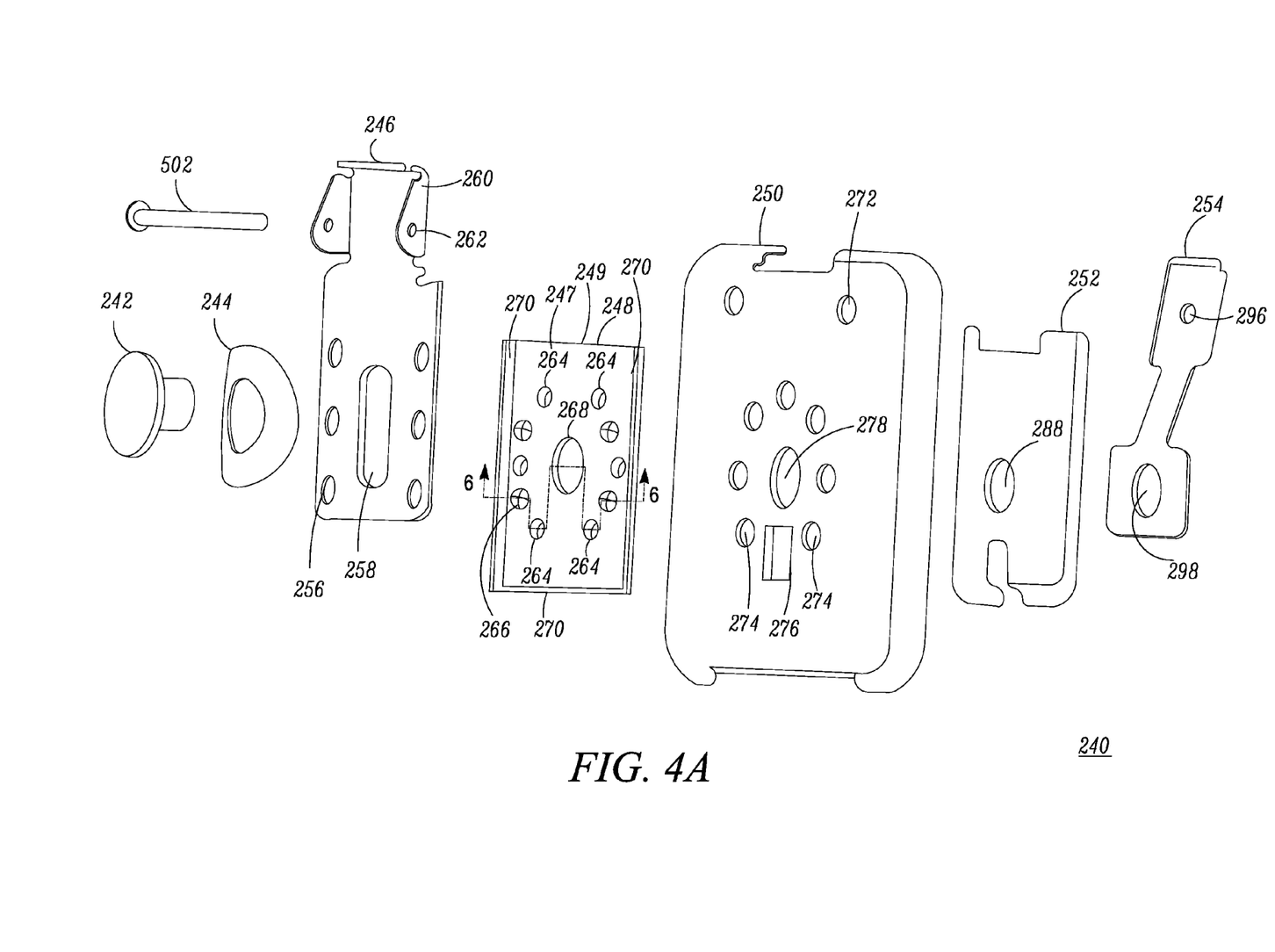
FIGS. 4A and 4B show exploded and assembled-perspective views of an adjustable swivel bracket sub-assembly in accordance with various embodiments of the invention.

FIG. 4A shows an exploded view of adjustable swivel bracket sub-assembly 240 comprising shoulder rivet 242, spring washer 244, hinge plate 246, swivel plate 248, and back plate 250. This view further shows a mounting plate 252 and lock spring clip 254 for mounting the swivel bracket sub-assembly 240 to a housing (shown later). Hinge plate 246, swivel plate 248, back plate 250, mounting plate 252 and lock spring clip 254 all have apertures 258, 268, 278, 288, 298 respectively which align to receive shoulder rivet 242 secured by spring washer 244 at the hinge plate.

Hinge plate 246 may be formed of sheet metal or material having similar stiffness, strength and configuration properties. Hinge plate 246 comprises a bracket area 260 having pin-holes 262 formed therein. Hinge pin 502 is used to couple the adjustable swivel bracket sub-assembly 240 to the adjustable paddle sub-assembly 210. Pin 502 couples bracket areas 228 of the bottom paddle 218 with bracket areas 260 of the hinge plate 246.

In accordance with an embodiment, hinge plate 246 further comprises linearly aligned through-holes 256. Swivel plate 248 has a first set of linear protrusions 266 formed on top surface 247 within walls that form a three sided tray 270 within which to slide hinge plate 246. Aperture 258 is an elongated aperture which allows linear movement of the hinge plate 246 within the confines of the three sided tray 270 of swivel plate 248. Linear movement of hinge plate 246 translates to linear movement of the paddle sub-assembly 210 (as was seen FIG. 2B). To position and retain the hinge plate 246, the linearly aligned protrusions 266 slide into holes 256 as the hinge plate 246 is slid linearly within the tray 270 of swivel plate 248. Accordingly, the hinge point location 500 of paddle sub-assembly 210 is made adjustable by sliding hinge plate 246 linearly such that the first set of linear protrusions 264 slide into holes 256.

In accordance with an embodiment, a second set of protrusions 264 are located on an opposing/back surface 249 of swivel plate 248. Protrusions 264 on back surface 249 of swivel plate 248 form a circle. A plurality of openings 274 forming a circle are located on the back plate 250 which align with the plurality of protrusions 264 located on the opposing side 249 of swivel plate 248. Rotation of the swivel plate 248 rotates protrusions 264 into holes 274 of pack plate 250. Rotation of swivel plate 248 translates to rotation of hinge plate 246 and the paddle sub-assembly 210 about a fixed pivot point located at aperture 278 thus providing rotation of hinge point location 500.

Figure 4B:
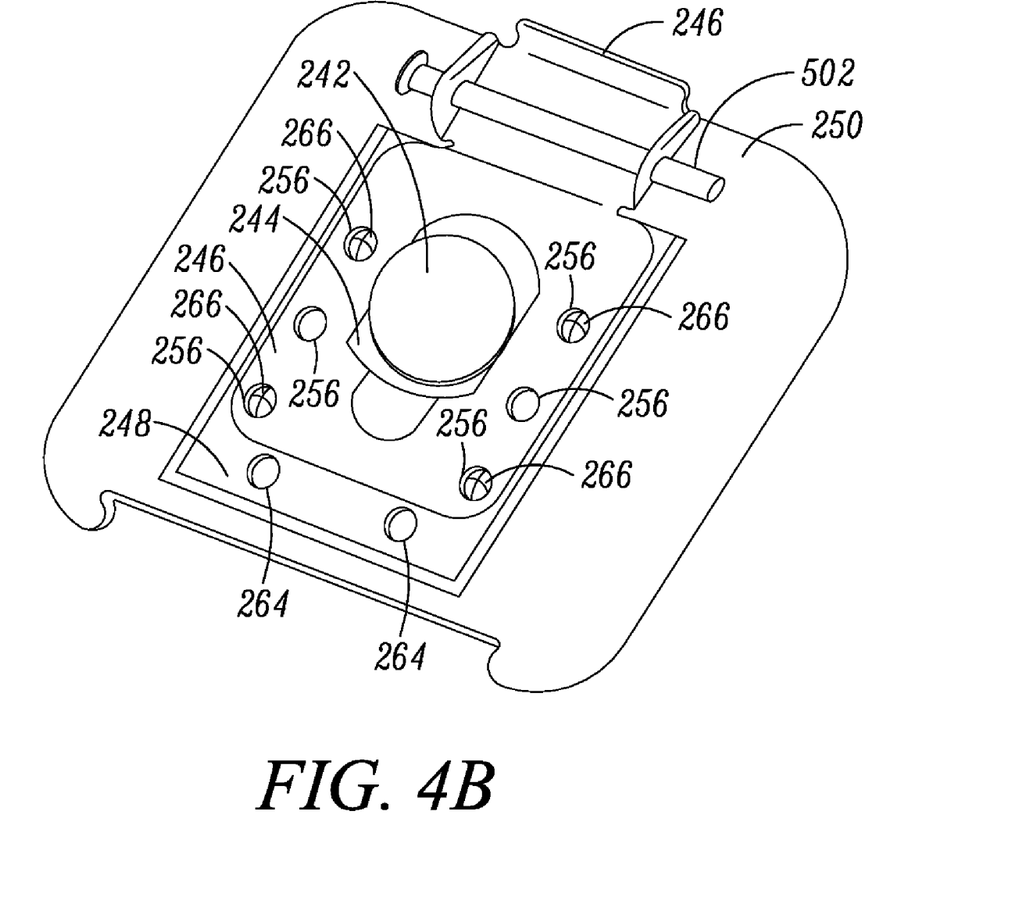

FIG. 4B shows an assembled perspective view of the adjustable swivel bracket sub-assembly 240. The two piece swivel plate is formed of hinge plate 246 and swivel plate 248 to provide both linear and rotational adjustment. This assembled view illustrates shoulder rivet 242 and spring washer 244 coupling hinge plate 246 and swivel plate 248 to back plate 250. The plurality of protrusions 266, which are aligned linearly on swivel plate 248, protrude through the linearly aligned holes 256 on hinge plate 246. Linear adjustments can be made by the user grabbing bottom paddle 218 near hinge point location 500 to shift/slide the hinge plate 246 within the confines of the swivel plate 248 thereby having holes 256 settle on protrusions 266. While not seen in this view, the plurality of openings 274 that form the circle on the back plate 250 receive the plurality of protrusions 264 from the opposing side 249 of the swivel plate 248. To make rotational adjustments, the user grabs the paddle sub assembly 210 (swivel plate 248/hinge plate 246) to a desired degree of rotation. Accordingly, hinge point location 500 can be adjusted both linearly and rotationally according to the various embodiments of the invention via the two piece swivel plate formed of hinge plate 246 and swivel plate 248.

Figure 5:
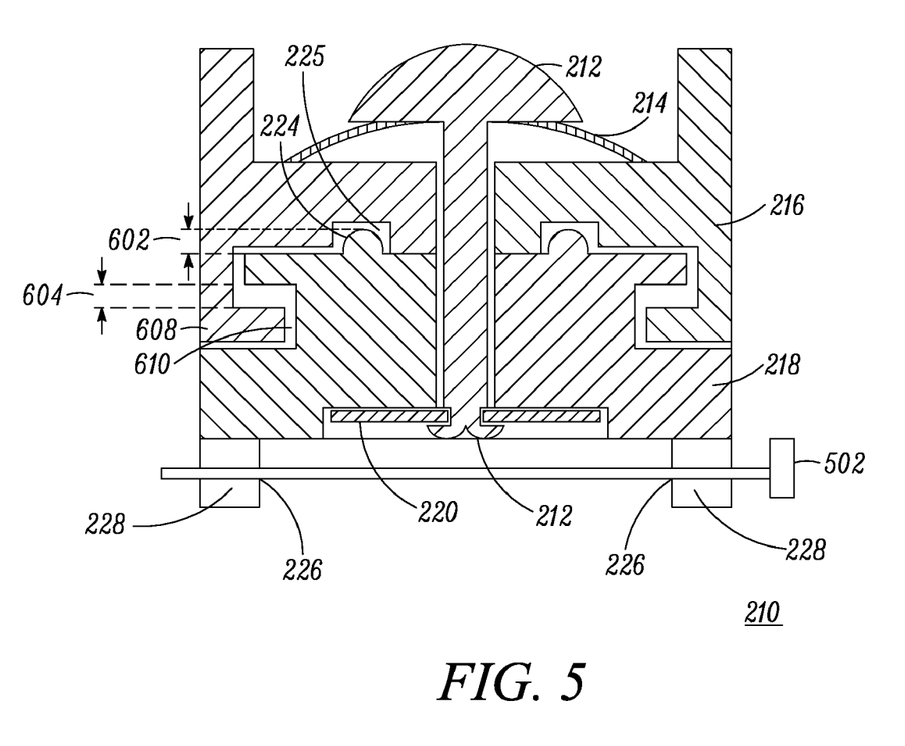
FIG. 5 is an example of a sectional view of the adjustable paddle sub-assembly in accordance with various embodiments of the invention.

FIG. 5 is a cross sectional view of the various components of the adjustable paddle sub-assembly 210 in accordance with various embodiments of the invention. The adjustable paddle sub-assembly 210 is coupled together via a spring force provided by shoulder rivet 212, spring washer 214 coupling top paddle 216 to bottom paddle 218 with flat washer 220. Bracket portion 228 of bottom paddle 218 is shown with hinge pin 502 extending through hinge pin-hole 226. Top paddle 216 includes side edges 608 that slide along chamfer 610 for alignment. Tolerance spacing 604 within chamfer 610 accommodates the height 602 of the bumps 224. This height/spacing 602/604 allows bumps 224 to fall within recesses 225 while edges 608 slide along chamfer 610 during paddle length adjustment. All movement related to the adjustable paddle subassembly 210 is advantageously independent of the swivel bracket subassembly 240.

Figure 6:
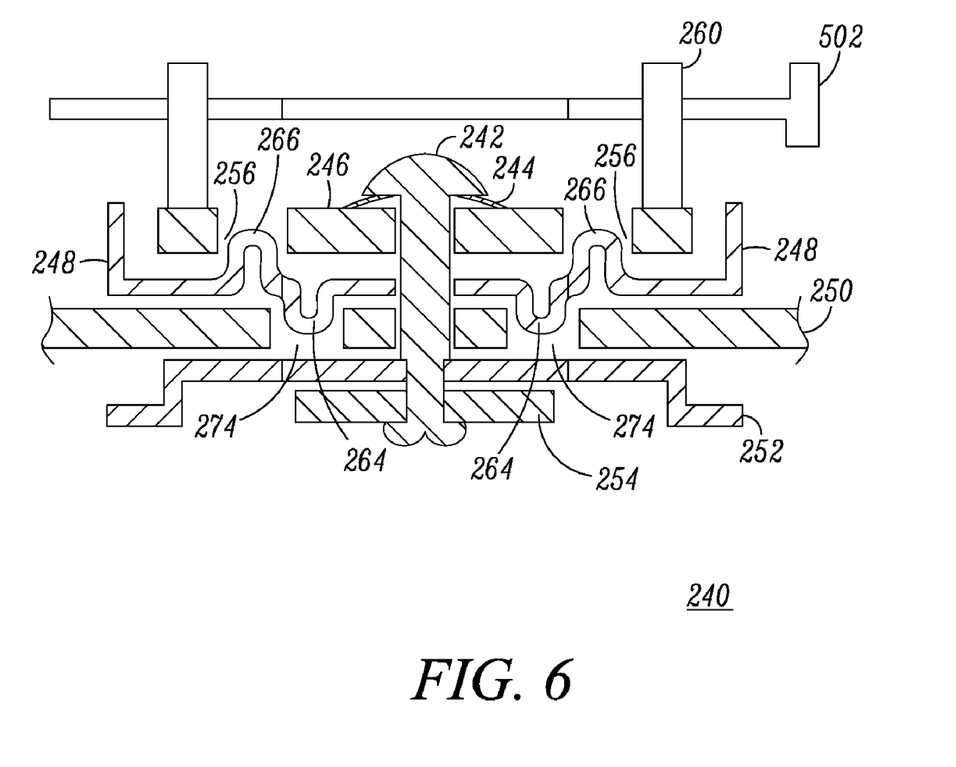
FIG. 6 is an example of a sectional view of the swivel clip of FIG. 4A in accordance with various embodiments of the invention.
Figure 7A:
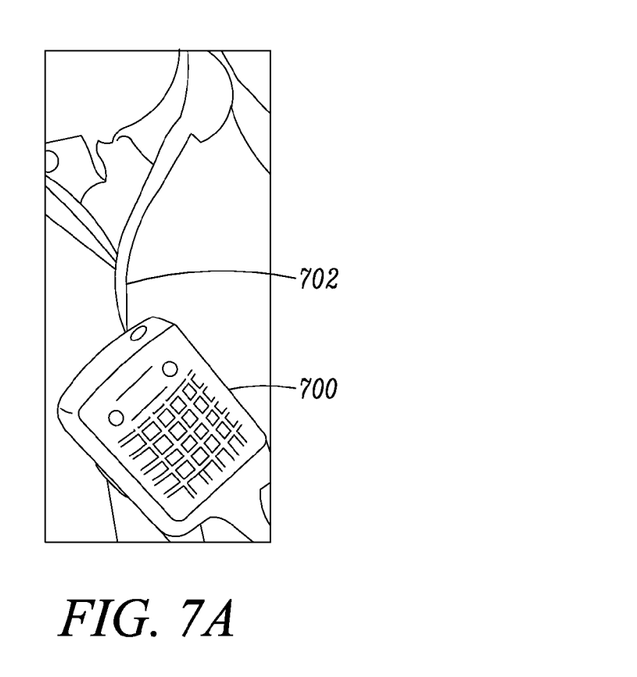
FIGS. 7A, 7B, 7C, 7D show various communication devices utilizing the swivel clip formed in accordance with embodiments of the invention.
Figure 7B:
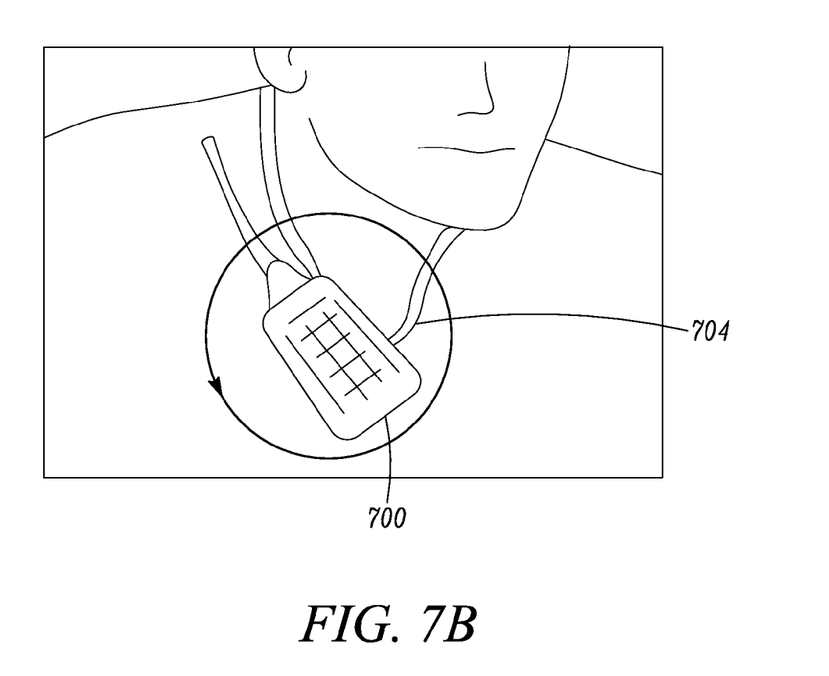
Figure 7C:
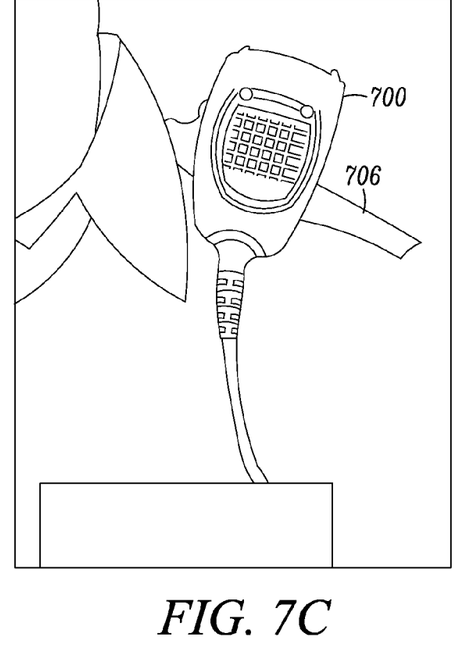
Figure 7D:
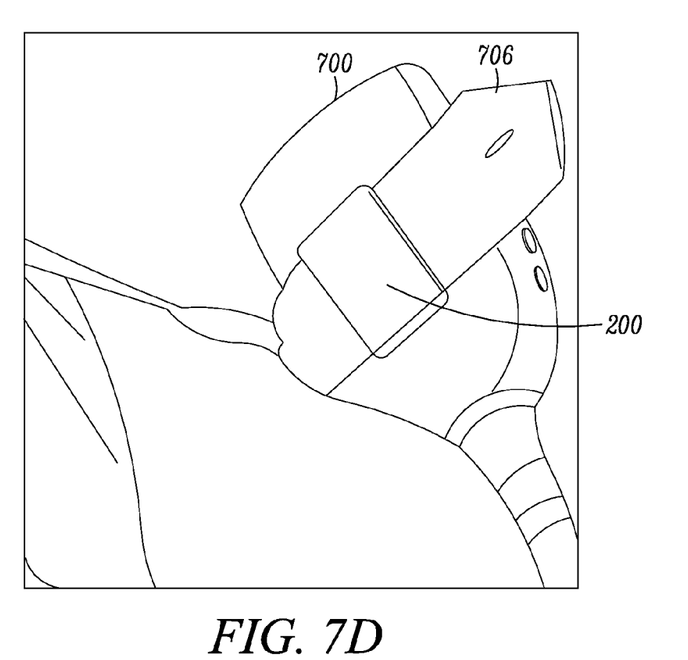

Referring to FIG. 6 a cross sectional view is provided to illustrate the coupling amongst the various components of the adjustable swivel bracket sub-assembly 240 in accordance with embodiments of the invention. This cross-sectional view is shown for stack-up and coupling purposes and is not intended to be to scale in terms of the spacing and location between protrusions 264, 266 (taken across plate 248 by line 6-6 in FIG. 4A).

A spring force interconnection is provided by shoulder rivet 242 and spring washer 244 coupling hinge plate 246, swivel plate 248, back plate 250, and mounting plate 252 via flat washer 254. The plurality of protrusions 266 of the swivel plate 248 align with and protrude through the plurality of holes 256 of the hinge plate 246. The plurality of protrusions 264 located on the opposing side of the swivel plate 248 align with and protrude through the plurality of openings 274 formed on back plate 250. Hinge plate 246 and swivel plate 248 are formed of consistent thickness.

FIGS. 7A, 7B, 7C, 7D show various communication devices utilizing the swivel clip 200 formed in accordance with the embodiments of the invention. In these views the portable communication device 700 is a wearable device and may take on a variety of functions such as a two-way radio, a remote speaker-microphone, a remote speaker, a cell phone, a pager, a combination cell phone and two-way radio, a personal digital assistant to name a few. The adjustable swivel clip 200 provides a wearable device that is user configurable to attach to items such as a belt, a shirt opening 702, a collar 704, or an epaulet 706 to name a few. Even non wearable items can benefit from the adjustment features provided by swivel clip 200, such as a rear view mirror and accessory straps to name a few.

Because the aspect ratio of the housing to the swivel clip can advantageously accommodate a ratio greater than one-to-one, the clip length adjusts to the housing width. The greater the distance between the housing's center of mass and the hinge, the better the product "hangs" vertically and doesn't tend to tip away from the user's body.

Figure 8A:
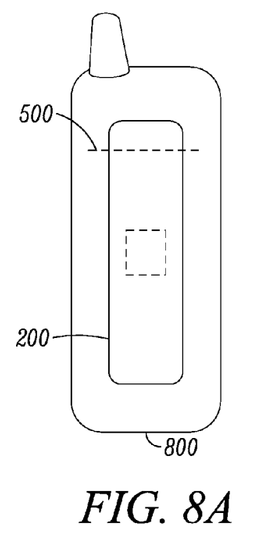
FIGS. 8A, 8B, 8C, 8D, 8E, 8F show a portable communication device having a swivel clip formed in accordance with various embodiments of the invention in various rotational and elongated/retracted positions.
Figure 8B:
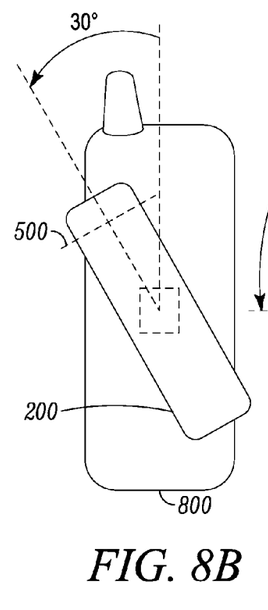
Figure 8C:
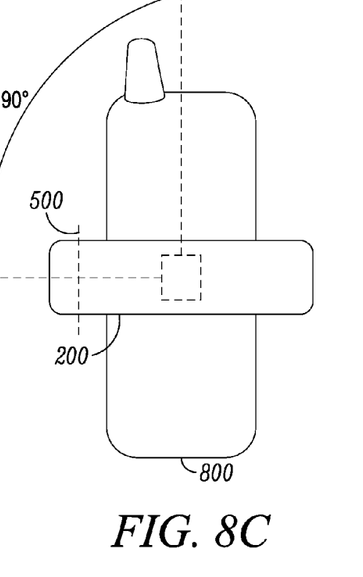
Figure 8D:
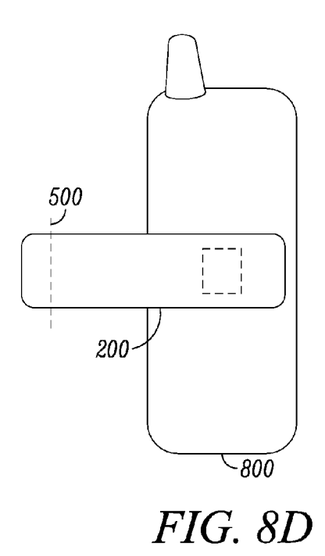
Figure 8E:
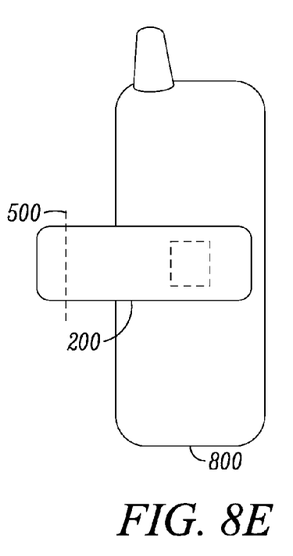
Figure 8F:
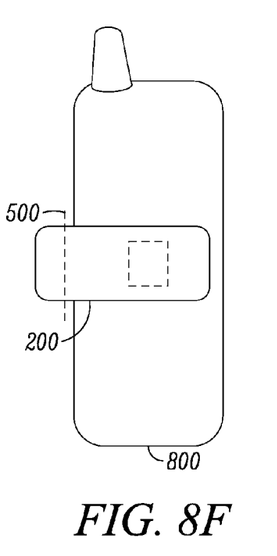

Referring to FIG. 8A, there is shown a portable communication device comprising a housing 800 having a swivel clip 200 formed in accordance with the various embodiments of the invention, mounted thereto. The swivel clip 200 provides an adjustable hinge point location 500 and an adjustable paddle length for user-configurable attachment. User configuration is achieved by rotating the paddle sub assembly 210, adjusting the hinge location 500 and/or adjusting the paddle length of two piece paddle 216/218 as discussed previously. In this embodiment, the communication device housing has a height/width aspect ratio greater than one. The swivel clip 200 is first shown rotated 30 degrees as seen in FIG. 8B and then 90 degrees in FIG. 8C with no adjustments to the hinge location or paddle length. FIG. 8D retains the 90 degree rotation and the original paddle length of 8C but has the hinge point location 500 extended to the left such that the paddle touches the housing. FIG. 8E retains the 90 degree and hinge point location of FIG. 8C but has the paddle shortened in length so as to touch the housing. FIG. 8F has the hinge point location 500 retracted closer to the housing and a reduced paddle length compared to FIG. 8E such that it continues to touch the housing. The swivel clip 200 with adjustable clip length 216/218 and adjustable hinge point location 500 provides the benefit of allowing an end of the clip 270 (seen in previous views) to come in contact with the housing regardless of product length throughout a 360 degree rotation thereby providing significant advantages over prior clip configurations. The ability to independently adjust the clip length and hinge location allows the same swivel clip of the present invention to be used on products of a variety of shape and size.

Accordingly, there has been provided a swivel clip that provides and adjustable clip length with clip rotation across 360 degrees. When coupled to a communication device, a user can now configure the clip to suit a variety of clothing and accessories changes, such as shirt, belt, briefcase strap to name a few. The independent adjustment provided by two sub-assemblies allows length to be adjusted interpedently of rotation. Thus, a communication device can now have a swivel clip in which hinge position, paddle length and rotational position are all independently adjustable. Products having aspect ratios height/width greater than one can use the same clip as products having one-to-one ratios, allowing one adjustable swivel clip to be used on a plurality of different sized devices.

Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A portable communication device, comprising:
   a housing;
   a swivel clip mounted to the housing, the swivel clip having an independently adjustable hinge point position, adjustable clip length and rotational position for user-configurable attachment; and
   the portable communication device providing a wearable device wherein the swivel clip is user configurable to attach to each of a belt, epaulet, shirt opening, and collar via the adjustable clip length and rotation of the hinge point position.

2. The portable communication device of claim 1, wherein the communication device housing has a height/width aspect ratio greater than one.

3. The portable communication device of claim 2, wherein the swivel clip comprises a two-piece paddle providing adjustable clip length.

4. The portable communication device of claim 1, wherein the portable communication device comprises at least one of: a two-way radio, a remote speaker-microphone, a remote speaker, a cell phone, a pager, a combination cell phone and two-way radio, a personal digital assistant.

5. The portable communication device of claim 3, wherein the swivel clip is configured by rotating the hinge point position and linearly adjusting the length of the two-piece paddle.

6. The portable communication device of claim 5, wherein the adjustable paddle length is extendable and retractable throughout rotation.

7. A swivel clip, comprising:
   a two piece paddle providing adjustable clip length; and
   a two piece swivel plate coupled to the two piece paddle clip via a hinge pin forming a hinge point position, the two piece swivel plate providing linear adjustment and rotational adjustment of the hinge point position.

8. The swivel clip of claim 7, further comprising protrusions extending from the two piece swivel plate and holes formed within the two piece swivel plate making linear adjustment to the hinge point position and rotation of the hinge point position.

9. The swivel clip of claim 7 further comprising:
   a back plate with holes formed therein forming a circle; and
   wherein the two piece swivel plate comprises:
      a hinge plate having linearly aligned holes formed therein; and
      a swivel plate having a first set of linearly aligned protrusions that align with the linearly aligned holes of the hinge plate and a second set of circularly aligned protrusions that align with the circularly aligned holes of the back plate.

10. The swivel clip of claim 9, wherein the two piece paddle provides a retractable and extendable clip.

11. The swivel clip of claim 10, wherein the two piece paddle comprises:
   a first paddle having linearly aligned recesses formed therein;
   a second paddle having linearly aligned bumps formed therein; and
   wherein the linearly aligned recesses and linearly aligned bumps engage and disengage to provide the adjustable clip length.

12. A clip assembly, comprising:
   an adjustable paddle sub-assembly for increasing and decreasing clip length; and
   an adjustable swivel bracket sub-assembly comprising an adjustable hinge point position throughout a 360 degree rotation.

13. The clip assembly of claim 12, wherein the adjustable paddle sub-assembly comprises:
   a shoulder rivet;
   a spring washer coupled to the should rivet;
   a top paddle having an opening for receiving the shoulder rivet and spring washer;
   a bottom paddle having an elongated aperture through which an end of the shoulder rivet protrudes; and
   a flat washer for coupling to the end of the shoulder rivet protruding through the elongated aperture.

14. The clip assembly of claim 13, wherein the top paddle has recesses that slide over and are retained by bumps on the bottom paddle to adjust the overall length of the paddle sub-assembly.

15. The clip assembly of claim 13, wherein the adjustable swivel bracket sub-assembly comprises:
   a shoulder rivet;
   a spring washer for coupling to the shoulder rivet;
   a hinge pin;
   a hinge plate for receiving the adjustable paddle sub-assembly via the hinge pin, the hinge plate having an elongated aperture through which to receive the shoulder rivet;
   a swivel plate for mounting to the hinge plate via the shoulder rivet;
   a back plate for mounting to the swivel plate via the shoulder rivet;
   a mounting plate for coupling to the back plate via the shoulder rivet; and
   a lock spring clip for coupling to the mounting plate via the shoulder rivet.

16. The clip assembly of claim 15, wherein the swivel plate and hinge plate provide 360 degree rotation via the shoulder rivet.

17. The clip assembly of claim 15, the hinge point is position adjusted via linear translation of the hinge plate within the swivel plate and rotational positioning of the swivel plate about the back plate.

18. The clip assembly of claim 17, further comprising:
   a plurality of holes aligned linearly on the hinge plate;
   a plurality of protrusions aligned linearly on the swivel plate that correspond with the plurality of holes linearly aligned on the hinge plate;
   a plurality of openings forming a circle formed on the back plate;
   a plurality of protrusions on an opposing side of the swivel plate that align with the circle formed on the back plate.

* * * * *

UNITED STATES PATENT AND TRADEMARK OFFICE
CERTIFICATE OF CORRECTION

PATENT NO. : 8,306,582 B2
APPLICATION NO. : 12/271876
DATED : November 6, 2012
INVENTOR(S) : Williams et al.

Page 1 of 1

It is certified that error appears in the above-identified patent and that said Letters Patent is hereby corrected as shown below:

In the Claims:

In Column 8, Line 15, in Claim 13, delete "should" and insert -- shoulder --, therefor.

In Column 8, Line 45, in Claim 17, delete "claim 15, the" and insert -- claim 15, wherein the --, therefor.

Signed and Sealed this
Sixteenth Day of April, 2013

Teresa Stanek Rea
*Acting Director of the United States Patent and Trademark Office*